US009926734B2

(12) United States Patent
Dora

(10) Patent No.: US 9,926,734 B2
(45) Date of Patent: Mar. 27, 2018

(54) HINGE

(71) Applicant: FARINGOSI HINGES S.r.l., Ospitaletto (BS) (IT)

(72) Inventor: Massimo Dora, Ospitaletto (IT)

(73) Assignee: FARINGOSI HINGES S.R.L., Ospitaletto (BS) (IT)

( * ) Notice: Subject to any disclaimer, the term of this patent is extended or adjusted under 35 U.S.C. 154(b) by 0 days.

(21) Appl. No.: 14/760,566

(22) PCT Filed: Jan. 8, 2014

(86) PCT No.: PCT/IB2014/058111
§ 371 (c)(1),
(2) Date: Jul. 13, 2015

(87) PCT Pub. No.: WO2014/111827
PCT Pub. Date: Jul. 24, 2014

(65) Prior Publication Data

US 2015/0354261 A1 Dec. 10, 2015

(30) Foreign Application Priority Data

Jan. 15, 2013 (IT) .............................. MI2013A0044

(51) Int. Cl.

| | |
|---|---|
| ***E05F 11/08*** | (2006.01) |
| ***E05F 15/70*** | (2015.01) |
| ***F24C 15/02*** | (2006.01) |
| ***E05F 15/616*** | (2015.01) |
| ***E05F 1/12*** | (2006.01) |

(Continued)

(52) U.S. Cl.
CPC ............ *E05F 15/70* (2015.01); *E05F 1/1261* (2013.01); *E05F 15/616* (2015.01); *F24C 15/023* (2013.01); *A47L 15/4261* (2013.01); *E05F 3/18* (2013.01); *E05F 3/20* (2013.01); *E05Y 2201/434* (2013.01); *E05Y 2800/232* (2013.01); *E05Y 2900/30* (2013.01)

(58) Field of Classification Search
CPC ..... E05F 15/70; E05F 3/18; E05F 3/20; E05F 15/616; F24C 15/023; A47L 15/4261
USPC .................................. 49/386, 339, 346, 344
See application file for complete search history.

(56) References Cited

U.S. PATENT DOCUMENTS 3,123,064 A 3/1964 Hartson
3,602,662 A * 8/1971 Haller ................. H01H 15/107 200/330

(Continued)

FOREIGN PATENT DOCUMENTS

AU 2008248881 B 2/2014
DE 202007006690 U1 9/2008

(Continued)

*Primary Examiner* — Jerry E Redman
(74) *Attorney, Agent, or Firm* — Lucas & Mercanti, LLP

(57) ABSTRACT

Hinge for a door which covers at least in part a compartment, of the type comprising a fixed support for coupling to a compartment frame, and a mobile support for coupling to a door, wherein such mobile and fixed support are at least rotatably constrained one to the other. The hinge also comprises a coil spring operatively interposed between the fixed support and the mobile support to impose a predefined law of motion to the mobile support with respect to the fixed support, and an actuator for applying a push or a pull force onto said mobile support with respect to the fixed one.

5 Claims, 2 Drawing Sheets

(51) Int. Cl.

| | |
|---|---|
| *E05F 3/18* | (2006.01) |
| *E05F 3/20* | (2006.01) |
| *A47L 15/42* | (2006.01) |

(56) References Cited

U.S. PATENT DOCUMENTS

| | | | | |
|---|---|---|---|---|
| 4,450,335 | A * | 5/1984 | Shimizu | H05B 6/6417 219/714 |
| 5,813,171 | A * | 9/1998 | Piltingsrud | E05F 15/63 49/139 |
| 5,937,481 | A | 8/1999 | Faringosi | |
| 7,243,396 | B2 * | 7/2007 | Vanini | E05D 13/123 16/286 |
| 7,895,998 | B2 * | 3/2011 | Lee | E05B 47/0002 126/194 |
| 8,047,198 | B2 * | 11/2011 | Meyer | F24C 15/023 126/190 |
| 8,365,470 | B1 * | 2/2013 | Campbell | E05F 11/34 49/246 |
| 8,677,689 | B1 * | 3/2014 | Draper | E05F 15/63 49/280 |
| 8,710,409 | B2 * | 4/2014 | Busalt | F24C 15/02 126/192 |
| 2006/0032019 | A1 * | 2/2006 | Kistner | E05D 11/1007 16/286 |
| 2007/0080275 | A1 * | 4/2007 | Stachowski | A61B 8/00 248/323 |
| 2007/0101542 | A1 * | 5/2007 | Lee | E05F 1/1276 16/286 |
| 2007/0193572 | A1 * | 8/2007 | Lee | E05F 1/1261 126/194 |
| 2007/0267401 | A1 * | 11/2007 | Collene | F24C 15/023 219/391 |
| 2008/0122332 | A1 | 5/2008 | Brustle | |
| 2008/0189908 | A1 * | 8/2008 | Lowry | B60R 11/00 16/231 |
| 2008/0196201 | A1 * | 8/2008 | Anderson | B60R 11/0235 16/232 |
| 2009/0295188 | A1 * | 12/2009 | Kahn | B60J 5/047 296/146.12 |
| 2010/0162847 | A1 | 7/2010 | Gassner | |
| 2010/0269300 | A1 * | 10/2010 | Yip | E05D 7/0009 16/374 |
| 2010/0314488 | A1 * | 12/2010 | Ashkenazi | F42B 10/16 244/3.27 |
| 2011/0308166 | A1 * | 12/2011 | Binder | E05F 1/1238 49/386 |
| 2012/0085036 | A1 * | 4/2012 | Nishida | E05F 5/10 49/386 |
| 2012/0180208 | A1 * | 7/2012 | White | A47K 13/242 4/300 |
| 2016/0138369 | A1 * | 5/2016 | Tunget | E21B 29/00 166/311 |
| 2016/0325642 | A1 * | 11/2016 | Fitzpatrick | B60N 2/045 |

FOREIGN PATENT DOCUMENTS

| | | | | |
|---|---|---|---|---|
| DE | 202010005934 | U1 | 7/2010 | |
| EP | 0541974 | | 5/1993 | |
| GB | 2350863 | | 12/2000 | |
| WO | 2006099645 | A1 | 9/2006 | |
| WO | WO 2007128943 | A1 * | 11/2007 | E05F 15/614 |
| WO | 2009039541 | A1 | 4/2009 | |

* cited by examiner

HINGE

CROSS-REFERENCE TO RELATED APPLICATIONS

This application is a 371 of PCT/IB2014/058111, filed Jan. 8, 2014, which claims the benefit of Italian Patent Application No. MI2013A000044, filed Jan. 15, 2013.

FIELD OF THE INVENTION

The present invention relates to the field of hinges, particularly to a hinge for a door which covers a compartment, for example the loading compartment of a household appliance, of the type comprising motor means for aiding opening and/or closing of the door, for example operated by an electric motor.

BACKGROUND ART

Hinges are known in the art, which comprise a motor drive, typically electric, acting to open/close the door.

For example, GB2350863 teaches to realize an oven provided with an electric-motor drive to open and close the cooking cavity. Such an oven provides the user with a manual control which, when operated, activates an electric motor for opening or closing the afore said doors. The electric motor, which acts directly as a door hinge, is sized to apply a force sufficient to fully open and close the doors, even when they are hinged along a horizontal axis.

In the known art such motor drives, for example constituted by electric motors coupled with a gearmotor or another kinematic chain connecting them to the fixed and mobile supports of a hinge, are therefore sized for moving the door completely and independently, and thus they are motor drives very expensive and bulky, also involving large power consumption.

Moreover, it is not possible to associate these solutions known in the art to pre-existing hinges, because the electric motor substantially replaces the conventional hinge.

Finally, in case of malfunctions of the motor or a power failure, such a solution makes it difficult to open the door, since the absence of a traditional hinge does not allow an easy opening and closing of the door, that are provided for example by means of a spring or other known means adapted to impose a predefined law of motion to the door itself, which are usually present in conventional hinges.

It is therefore an object of the present invention to provide a hinge which solves the above mentioned problems of the known art.

Another object of the present invention is to implement a hinge for doors which cover at least in part a compartment, preferably of a household appliance, provided with moving means that are simple, inexpensive and small in size.

Another object of the present invention is to provide a hinge for doors which cover at least in part a compartment, preferably of a household appliance, provided with motor means which can be easily coupled to the structure of pre-existing hinges.

A further object of the present invention is to provide a hinge of the type provided with motor means which can operate even completely manually.

SUMMARY OF THE INVENTION

The present invention achieves these and other objects by means of a hinge and a related usage method according to the appended independent claims and the respective dependent claims.

In particular, the present invention relates to a hinge for a door which covers at least in part a compartment, of the type comprising a fixed support coupled to the compartment frame, and a mobile support coupled to the door, wherein the mobile and fixed supports are at least rotatably constrained one to the other. The hinge according to the present invention also comprises means to impose a predefined law of motion to the mobile support with respect to the fixed support during opening and/or closing of said door, constituted for example by elastic means operatively interposed between the fixed support and the mobile support, as well as controlled motor means for aiding opening and/or closing of the door. Said controlled motor means apply a push and/or a pull force onto the mobile support with respect to the fixed support.

Using these controlled motor means, for example constituted by an electrically and/or electromagnetically operated actuator conveniently controlled by a programmable controller, which is coupled with a hinge provided with means to impose a predefined law of motion, it is possible to have a hinge which can easily be used even in case of power failure, or in any case of malfunction of motor means.

The presence of the afore said means to impose a predefined law of motion may also allow using motor means not excessively bulky and operating with lower power consumption.

It should be noted that, even though elastic means have been previously described as means to impose a predefined law of motion, other known means, not mentioned herein, may be provided in the hinge object of the present patent such as, for example, a cam-shaped arm, articulated to the mobile support and constrained to the afore said motion-guide bar, and forced to engage a follower roll constrained on the fixed support of the hinge, as taught e.g. by U.S. Pat. No. 5,937,481 A, without departing from the scope of protection required herein.

In any case, particularly if said means to impose a predefined law of motion comprise elastic means to counter and/or aid the opening and/or closing of the door, the motor means of the hinge according to the present invention can be sized, or controlled, such that they apply a push and/or pull force lower than the force necessary to open and/or close the door.

Then, especially in case of hinges with horizontal axis, said motor means are designed so as to apply a force that can aid the hinge itself and particularly said means to impose a predefined law of motion, during the opening and/or closing of the door, although by themselves they are not able to allow such an opening/closing. According to a preferred aspect of the present invention, the hinge further comprises at least one motion-guide bar articulated, directly or indirectly, to the mobile support of the hinge itself and coupled, at least slidingly, to said fixed support, or vice versa. Advantageously, in this case, the motor means apply an axial push and/or pull force onto such a motion-guide bar.

In this case the motor means, constituted for example in this case by an electric motor coupled to a kinematic system adapted to switch the circular motion into rectilinear motion, act on the motion-guide bar of the hinge, which is an existing component in many commercial hinges, and can be easily coupled to an already existing hinge.

Moreover, the motor means apply an axial force, that is to say directed along the axis of the motion-guide bar, preventing the whole hinge from being undesirably stressed. Further, according to a particular aspect of the present invention, the hinge can comprise a manual control operable by a user to operate the afore said motor means, preferably by means of an automatic programmable controller to control the latter. According to another aspect of the present invention, the hinge can be provided with means for decoupling by friction the guide bar from said aiding means.

Furthermore, the present invention relates to a method for opening and/or closing at least in part a compartment by means of a door through a hinge of the above described type, comprising the steps of a) detecting, automatically or by a manual control, at least an initial transient operated by an user of the opening or closing of the door;

b) operating the motor means for aiding opening and/or closing of the door to apply a push and/or a pull force onto the mobile support with respect to the fixed support of the hinge and therefore to aid, at least in part, the at least partially opening and/or closing of the door.

According to a preferred aspect of the method of the present invention, the motor means for aiding opening and/or closing of the door, apply onto the door a force lower than the force necessary to open and/or close the door itself, since the means to impose a predefined law of motion, constituted for example by elastic means (a spring), already aid the opening and/or closing of the door.

In other words, according to this aspect of the method claimed herein, the motor means, once detected the initial transient of the opening or closing of the door, act by taking the place of the user and, therefore, applying a force similar to the force the user would have applied if there were been no motor means.

According to another aspect of the present invention, the mentioned step of operating the motor means for aiding opening and/or closing of the door may comprise, during the opening of the door, the application of a push force of the mobile support with respect to the fixed support during the initial transient and of a pull force of the mobile support with respect to the fixed support during the final transient and/or, during the closing of the door, the application of a pull force of the mobile support with respect to the fixed support during the initial transient and of a push force of the mobile support with respect to the fixed support during the final transient during the closing of the door, or vice versa.

BRIEF DESCRIPTION OF THE FIGURES

Referring to the figures, an exemplary, non limiting, embodiment of the present invention will be introduced hereinafter, wherein.

DETAILED DESCRIPTION OF A PREFERRED EMBODIMENT OF THE PRESENT INVENTION

Figure 1:
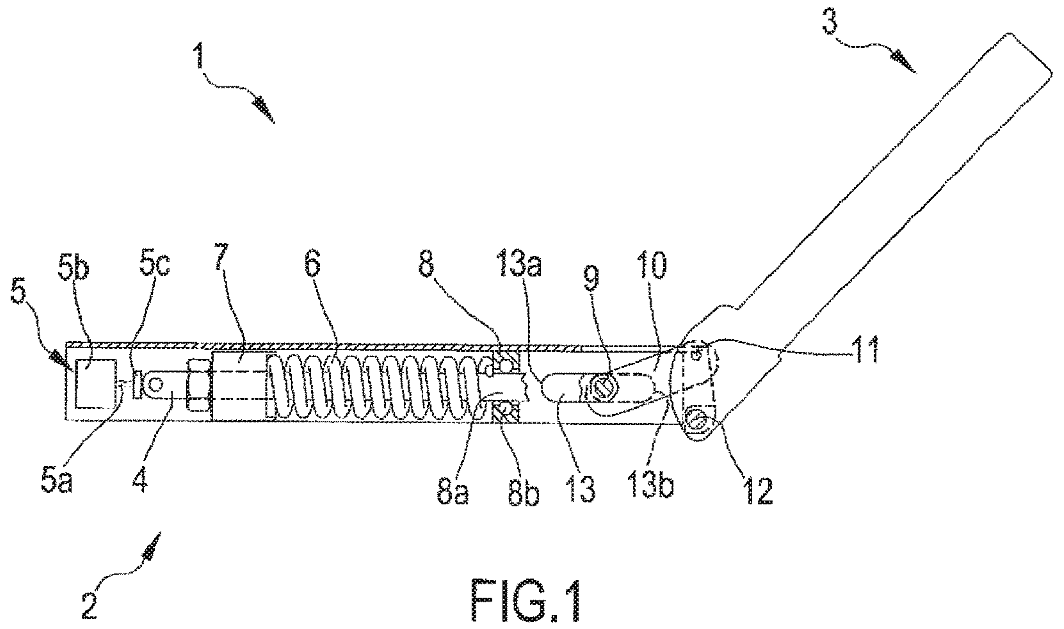
FIG. 1 is a side cut-away view of a hinge according to an embodiment of the present invention.

In the embodiment of the present invention shown herein, a hinge 1 for the door which covers at least in part a compartment, comprises a fixed support 2 coupled to the compartment frame, and a mobile support 3 coupled to the door. The mobile 3 and fixed 2 supports are rotatably constrained one to the other by means of the pin 12.

As known in the art, the door hinge 1 described herein is further provided with means 6 to impose a predefined law of motion to the mobile support 3 with respect to the fixed support 2. These usually mechanical means, allow to counter or aid the opening and/or closing of the door, and may comprise, for example, elastic means, means to dampen the motion, or means with guiding cam.

More particularly, the use of these means to impose a predefined law of motion to the mobile support 3 with respect to the fixed support 2, comprising the coil spring 6 in the hinge 1 shown herein, is intended to prevent the door from opening with an overspeed and/or to aid closing the door itself, especially if the hinge 1 is installed so that its axis of rotation is horizontal.

In the hinge 1 described herein, these means to impose a predefined law of motion are constituted by a coil spring 6 operatively interposed between said fixed 2 and said mobile 3 supports of the hinge 1, even if other means can be provided in addition, or in substitution, to said elastic means, such as a fluid dynamic damper. In the hinge subject matter of this patent, other known means, not mentioned herein, to impose a predefined law of motion to the mobile support 3 can be provided, such as the cam and follower type described in U.S. Pat. No. 5,937,481 A, or those described in U.S. Pat. No. 3,123,064.

These above mentioned cam and follower means, usually in addition to the afore mentioned elastic means or spring 6, are intended to prevent the door overspeed at the end of the opening and closing steps of the door itself, in addition to make more stable the final position of opening or closing of the door.

The spring 6, as known, prevents abrupt movements of the door and, particularly, in case of doors pivoting on a horizontal axis, it brakes the door fall by gravity during the opening step thereof, whereas during the closing step it helps the user to counter the weight of the door. As a matter of fact, because of the compression of the spring 6 during the door opening, the spring will expand during closing thereof to return to its starting configuration, applying on the door a force aiding the force used for closing the door itself.

According to a preferred embodiment of the present invention, the coil spring 6 is operatively interposed between the supports 2 and 3 of the hinge 1 thanks to a motion-guide bar 4 (hereinafter also named bar 4) which is articulated to the mobile support 3 and slidingly coupled, that is to say constrained, to the fixed support 2.

In more detail, the fixed support 2 comprises a frame housing the spring 6 and to which a supporting element 8 is fastened and provided with a recess **8*a* wherein the bar 4 slidingly engages. The latter, having generally a substantially straight axis, is therefore slidingly constrained to the fixed support 2 due to its sliding engagement inside the recess 8*a*, the sliding being facilitate by bearings 8*b* aiding the relative movement of the bar 4 with respect to the supporting element 8, and is arranged inside the turns of the coil spring 6**.

It should be noted that the supporting element 8 acts as a countercheck for one end of the coil spring 6.

As previously mentioned, the bar 4 is also constrained to the mobile support 3 by means of a slider-crank system. In particular, the bar 4 is provided with a pin 9, to which a first end of a connecting rod 10 is hinged. The second end of the connecting rod 10 is hinged to a pin 11 integral with the mobile support 3 in a position far from the pin 12 of the hinge 1.

In this way, between the hinging point 12 of the fixed 2 and the mobile 3 supports of the hinge 1 and the pin 11 of the connecting rod 10 there is an arm operatively forming a crank for the afore said connecting rod 10 so that the connecting rod 10, together with the mobile support, substantially form a slider-crank system.

It should be noted that, although in the present description the bar 4 is articulated to the movable support through a connecting rod 10, other articulating modes can be provided.

The end of the bar 4 opposite to the end engaged with the connecting rod 10 is integrally fastened to a slider 7 acting as a mobile support for the end of the spring 6 that is not rested to the supporting element 8.

Therefore, in the embodiment of the invention shown herein, the spring 6, as mentioned for example of the coil compression type, is made integral at one end with the slider 7, that slides integral with the bar 4, and at the other end with the supporting element 8, that is integral with the frame of the fixed support 2.

It should be noted that a larger number of guide bars can also be provided, and it is also possible to reversely constrain the bar 4 to the supports 2, 3, articulating it with respect to the fixed support 2 and making it slide with respect to the mobile support 3 and thus arranging the spring 6 inside the mobile support 3.

In the embodiment shown herein, due to the slider-crank kinematic system described above, the relative rotation of the mobile support 3 with respect to the fixed support 2 about the hinging point 12 causes the axial movement of the bar 4 with respect to the fixed support 2, and the related dragging of the slider 7 and then the compression or expansion of the spring 6 depending on the rotation direction of the mobile support 3. It should be noted that the pin 9, during its travel, is guided within a slot 13 obtained on the outer frame of the fixed support 2 which allows the bar 4 to move only axially and defines limit points for the bar 4 itself, corresponding to the required engagement of the pin 9 with the ends 13*a* and 13*b* of the slot 13.

The herein described hinge 1, according to the present invention, also comprises controlled motor means 5 for aiding opening and/or closing of the door, applying a push and/or pull axial force onto the mobile support 3 with respect to the fixed support 2 of the hinge 1, preferably by directly operating on the bar 4 so that to influence the movement of the hinge 1 itself, as better explained below.

These motor means preferably comprise electrically and/or electromagnetically operated actuators and, particularly, can comprise an electric motor.

In the embodiment shown herein, they are schematically shown by means of a stem 5*c*, integral with or however constrained to the bar 4 such as to push it and/or to subject it to a pull force, positioned at the end of an actuator 5*a* moved by a drive 5*b*. More specifically, the stem 5*c*, operated by the drive 5*b*, is integral with the bar 4 or however able to transmit onto it a push force which is axial or along the bar axis, so as to prevent undesired bending of the bar 4 itself.

Preferably, the push or pull axial force applied by the motor means 5 for aiding opening or closing of the door is lower than the force necessary to open or close independently the door itself. In other words, the motor means 5 are sized, or operatively controlled, by a special controller such that, according to an embodiment shown here, the force applied in particular onto the bar 4 is lower than the force necessary to fully open and/or close the door.

For ease of illustration, the aiding means 5 will be hereinafter identified as the motor 5, without limiting the generalities. Indeed, in the present invention it is intended that is possible to use any motor means able to apply a push and/or pull force onto the mobile support 3 with respect to the fixed support 2 of the hinge.

In the hinge 1, the motor 5 can be constituted by various electrically and/or electromagnetically operated means for aiding opening and/or closing of the door, such as the so-called magnetic drive motors, wherein a linear actuator is moved according to changes of the magnetic field of a stator surrounding the actuator itself. The motor 5 of the hinge 1 can be controlled by a programmable automatic controller, and it can operate depending on a manual control, such as a push-button switch arranged on the compartment frame or on the door handle, or elsewhere, and operable by the user or by sensors of the position or motion of the door itself, of the hinge 1 or of the motor 5, which can activate the motor 5 itself during the initial and/or final transient of the opening and/or closing of the door.

For example, it is possible to provide position sensors that are able to detect the angular position of the door. The data from these sensors can be processed by a control unit for controlling the operations of the motor 5 or of an equal means, that is to say the related starting and stopping.

Moreover, because the aiding means, as well as the shown motor 5, are electromagnetically operated, they can be provided with a transducer able to detect the changes of the magnetic field inside the means, so as to determine the axial position of the actuator 5*a* or of a similar actuator.

Alternatively, it is possible to detect the degree of power consumption of the drive 5*b* or an equal device, and to set the start/stop of the same according to the detected data.

It is preferable that the motor 5 performs a maximum of 20-30% of work, and preferably about 10% of work during the first opening step of the door, that is to say when it is operating, and that the spring performs the remaining 70-90% of work.

In this case, the power of the motor 5 can be much lower than the power of the motors of the prior art, the latter being able to individually open the compartment, thus performing 100% of the work onto the door.

For this reason, although the motor 5 of the present invention allows the user to apply a lower force while moving the door, it is greatly reduced in size and cost with respect to the background art.

It should be noted that it is possible to start and stop the motor 5 by means of switches which are operated when the motor 5 reaches predetermined limit positions. Means can be further provided for decoupling the aiding means from the guide bar 4, such as to make the door movable in a completely manual way. These means are known in the art and can be mechanical and/or electrical, for example a clutch and/or switches. Such decoupling means can be actuated in case of malfunction of the means 5 for aiding opening and/or closing of the door or in case of power failure.

Due to the decoupling means, in such cases it is possible to open the compartment in a fully-manual mode.

The above described hinge 1 allows to perform the method for opening/closing a compartment by means of a door claimed herein, at least partially, comprising the steps of:

a. detecting, automatically or by a manual control, at least an initial transient operated by an user of the opening or closing of the door;
b. operating the motor means 5 for aiding opening and/or closing of the door to aid at least in part the at least partially opening an/or closing of the compartment by means of the door by applying a push and/or a pull force onto the mobile support 3 with respect to the fixed support 2 of the hinge 1.

Preferably, in the step of operating the afore said means 5 for aiding opening and/or closing of the door, the last ones apply on the door a force lower than the force necessary to open and/or close the door itself.

In fact, a limited force should be applied on the door to open or close the compartment due to the presence of means to impose a predefined law of motion, constituted for example by the coil spring 6 previously described.

For this reason, the means for aiding opening and/or closing of the door, that is to say the motor 5, can be constituted by a relatively low-power electric motor 5, being therefore small sized and energy saving, which can simply aid to open or close the door but which is not able to perform this task in the absence of the force (or reaction) applied by the afore said means 6 to impose a predefined law of motion. According to an aspect of this method, the above mentioned step of detecting at least an initial transient involves to operate a manual control, connected to a controller which operates the motor 5 by means of a user.

Moreover, according to another aspect, the step of operating the means 5 for aiding opening and/or closing of the door can be restricted to an initial transient of the opening or closing, but the motor 5 is preferably operated during the initial transient as well as during the final transient of the opening and closing movements of the door, as will be seen.

Thus, the operation of the hinge 1 described above, according to the method of the present invention, provides that, in the initial steps of opening of the compartment (initial transient), the user manually operates a control, such as a button, connected to a programmable controller to control the motor 5 which then is actuated.

The controller causes the motor 5 to apply a push force onto the bar 4 by means of the stem 8*c*, the force being transmitted to the connecting rod 10 and then from this through the pin 11 to the mobile support 3, the latter starting to pivot around the pin 12 with respect to the fixed support 2.

Not only the push force applied by the motor 5 can overcome the door inertia and therefore allow the mobile support 3 to start rotating, but also overcome or counter the force applied by the spring 6, which is compressed from its starting position by the translation of the bar 4 itself, due to its constraint to the slider 7 and the supporting element 8.

Figure 2:
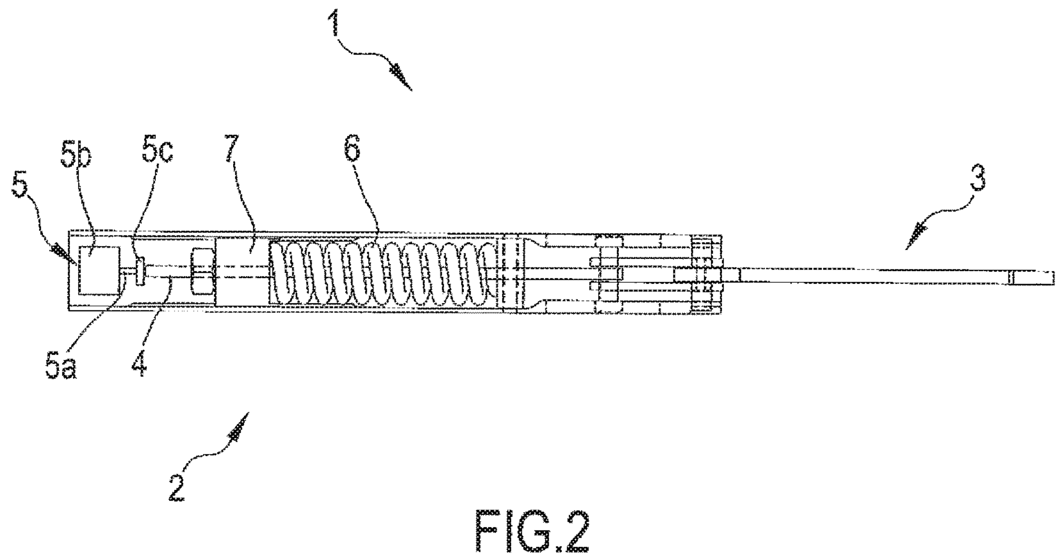
FIG. 2 is a plan cut-away view of the hinge of FIG. 1.
Figure 3:
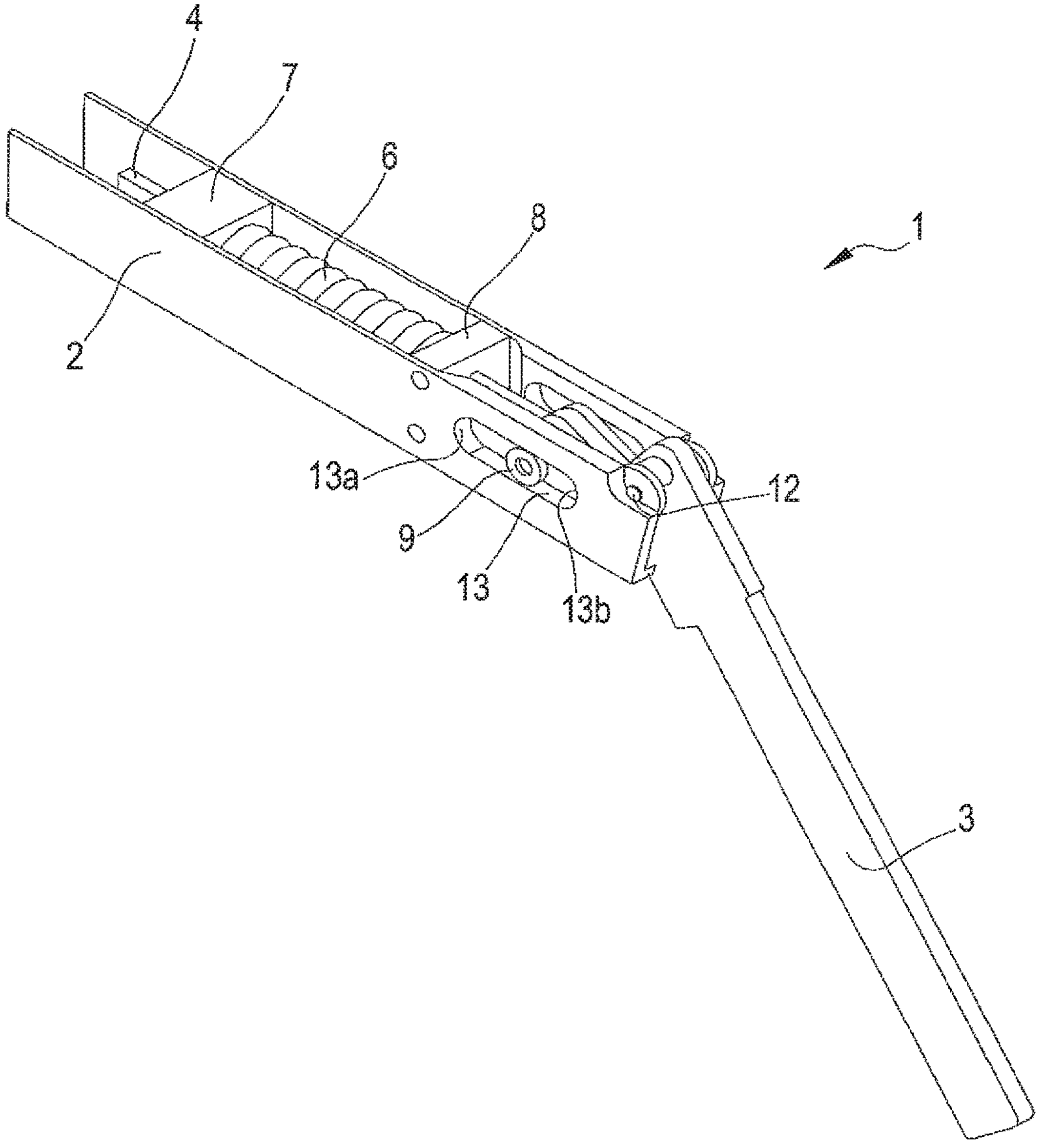
FIG. 3 is a perspective view of the hinge of FIG. 1 wherein the motor has been omitted.

Referring particularly to FIGS. 1 and 2, the mobile support 3 is pivoted clockwise around the hinging point 12. The bar 4 is then axially dragged to the right by the connecting rod 10 acting on the pin 9. The sliding element 7 moves integrally with the bar 4 and compresses the spring 6.

If the door hinge 1 has lower horizontal axis, such as for example in a oven compartment, the programmable controller of the motor 5, for opening the door, can operate it so as to push the bar 4 at least in the initial transient until the door can independently complete the rotation thanks to its weight and the initial inertia. Alternatively, if the door hinge still has lower horizontal axis, in order to open the door the programmable controller can cause the motor 5 to apply an axial push force onto the bar 4 only in the initial transient, for example until the door, and thereby the fixed support 3, exceeds an initial tilt angle of 45°, then stopping the motor operation to control the motor 5 for applying an opposite pull force onto the same bar 4, at least during the final transient, so as to brake the rotatingly fall of the door itself and to prevent any possible impact of the door when it reaches its limit.

In this case, the hinge 1 can be provided with sensors for detecting, directly or indirectly, the position and/or the motion of the mobile support 3 with respect to the fixed support 2, operatively connected to the afore said programmable controller of the motor 5.

However, it should be noted that the presence of the spring 6, or other means to impose a predefined law of motion to the mobile support 3 with respect to the fixed support 2 that can in turn apply forces or reactions countering the opening rotation of the door, allows the motor 5 to apply a force lower than the force necessary to independently open the door.

Further it should be noted that is particularly advantageous that the motor 5 drives the bar 4 to cause the hinge to rotate, because this solution allows to use the motor 5 with pre-existing hinges 1 and because the axial force of the motor is transmitted to the straight bar 4 without generating bending stresses, in theory.

Similarly, according to the method described herein, if the door is open and the user wants to close it, the operation of the motor 5, controlled automatically and for example through a manual control operated by the user, at the beginning of the closing rotation of the door by means of the user, provides an aiding force for closing the door, at least in the initial transient.

In this case, when the initial transient of the closing step ends due to the pull force applied by the motor 5 onto the bar 4 and through the connecting rod 10 onto the mobile support 3 of the hinge 1, the spring 6 compressed during the opening of the door, applies an expanding force that also applies a pull force onto the bar 4, aiding the automatic closing of the door.

Thus, the motor 5 can be advantageously operated during, and also after, the initial transient of the closing step of the door, so that to apply on the latter a pull force and to allow the spring 6 to expand back to its original configuration.

This extending (expanding) operation of the spring 6 can generally produce a force that, together with the pull operation of the motor 5, is able to allow the independent closing of the door.

In case of door hinge 1 having a horizontal lower axis, it is possible to operate the motor 5 at the final transient, to prevent impacts and then to smoothen the closing of the door, the motor being controlled by the afore said programmable controller on the basis of data coming, e.g., from sensors of position and/or motion of the mobile support 3 of the hinge 1, such as to apply a push force onto the bar 4 and then to counter the pull force applied on the latter by the spring 6 only in the imminence of the final transient of the closing operation of the door.

It should be emphasized that, although a motor operation has been described only during the initial and/or final steps of the opening and closing of the door, it is however possible to use the present invention so as to control the operation of the motor 5, or a similar aiding means, also, or only, next to critical points which are not positioned at the ends of the door travel.

Finally, it should be noted that this hinge is particularly and advantageously used in doors for loading compartments of household appliances, especially with drop down doors, that is to say, doors having a substantially lower horizontal axis of rotation.

The invention claimed is:

1. Hinge comprising a fixed support, a mobile support, said mobile and fixed support being at least rotatably constrained one to the other, an elastic means operatively interposed between said fixed support and said mobile support to impose a predefined law of motion to the mobile support with respect to the fixed support over the entire stroke of the mobile support with respect to the fixed support, a controlled motor means for applying a push or a pull force onto said mobile support with respect to said fixed support, and a motion guide bar articulated to said mobile support and coupled slidingly to said fixed support, wherein said motor means apply an axial push or pull force onto said motion guide bar in such a way that the motor performs a maximum of 20-30% of work during the first opening/closing step of the mobile support, and the elastic means performs the remaining 70-90% of work.

2. Hinge according to claim 1, wherein said motor means comprise electrically or electromagnetically operated actuators.

3. Hinge according to claim 2, wherein said electrically or electromagnetically operated actuators comprise an electric motor.

4. Hinge according to claim 1, further comprising one or more sensors for detecting, directly or indirectly, a position or a motion of the mobile support with respect to the fixed support.

5. Hinge comprising a fixed support, a mobile support, said mobile and fixed support being at least rotatably constrained one to the other, an elastic means operatively interposed between said fixed support and said mobile support to impose a predefined law of motion to the mobile support with respect to the fixed support over the entire stroke of the mobile support with respect to the fixed support, wherein said fixed support comprises a frame housing the elastic means and to which a supporting element provided with a recess is fastened, a controlled motor means for applying a push or a pull force onto said mobile support with respect to said fixed support, and a motion guide bar articulated to said mobile support and coupled slidingly to said fixed support by means of a slider-crank system, said motion guide bar further slidingly engaging said recess, said slider-crank system comprising a slider that slides integral with said motion guide bar, wherein said supporting element acts as a countercheck for one end of said elastic member and said slider acts as a mobile support for the other end of said elastic member, wherein said motor means apply an axial push or pull force onto said motion guide bar via said slider in such a way that the motor performs a maximum of 20-30% of work during the first opening/closing step of the door, and the elastic means performs the remaining 70-90% of work.

* * * * *